(12) United States Patent
Kim

(10) Patent No.: US 12,172,662 B2
(45) Date of Patent: Dec. 24, 2024

(54) APPARATUS AND METHOD FOR CONTROLLING VEHICLE

(71) Applicants: Hyundai Motor Company, Seoul (KR); Kia Corporation, Seoul (KR)

(72) Inventor: Kyoung Jun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 197 days.

(21) Appl. No.: 17/949,462

(22) Filed: Sep. 21, 2022

(65) Prior Publication Data

US 2023/0249705 A1    Aug. 10, 2023

(30) Foreign Application Priority Data

Feb. 8, 2022  (KR) .................. 10-2022-0016396

(51) Int. Cl.
| | |
|---|---|
| *B60W 50/14* | (2020.01) |
| *B60K 35/00* | (2024.01) |
| *B60R 1/27* | (2022.01) |
| *G06V 20/58* | (2022.01) |
| *B60K 35/28* | (2024.01) |
| *B60K 35/29* | (2024.01) |

(52) U.S. Cl.
CPC ............ *B60W 50/14* (2013.01); *B60K 35/00* (2013.01); *B60R 1/27* (2022.01); *G06V 20/586* (2022.01); *B60K 35/28* (2024.01); *B60K 35/29* (2024.01); *B60K 2360/176* (2024.01); *B60K 2360/178* (2024.01); *B60K 2360/1868* (2024.01); *B60R 2300/806* (2013.01); *B60R 2300/8093* (2013.01); *B60W 2050/146* (2013.01)

(58) Field of Classification Search
CPC ............ B60W 50/14; B60W 2050/146; G06V 20/586; B60R 1/27; B60R 2300/806; B60R 2300/8093; B60K 35/00; B60K 2360/178; B60K 35/28; B60K 2360/1868; B60K 2360/176; B60K 35/29
See application file for complete search history.

(56) References Cited

U.S. PATENT DOCUMENTS

| | | | | |
|---|---|---|---|---|
| 7,432,799 | B2 * | 10/2008 | Tsuboi ................ | H04N 7/181 |
| | | | | 348/E7.086 |
| 11,884,265 | B1 * | 1/2024 | Suzuki ................. | G08G 1/143 |
| 2003/0165255 | A1 * | 9/2003 | Yanagawa ............. | B60R 1/27 |
| | | | | 382/104 |

(Continued)

FOREIGN PATENT DOCUMENTS

EP         3166311 A1 *   5/2017   .............. B60R 1/00

*Primary Examiner* — Chico A Foxx
(74) *Attorney, Agent, or Firm* — Fox Rothschild LLP

(57) ABSTRACT

Disclosed are an apparatus and method for controlling a vehicle. The apparatus includes a camera that obtains a surrounding image of the vehicle, a sensor that detects a surrounding object of the vehicle, and a controller that determines a conversion image from among the surrounding images based on one of a parking area when the vehicle is parked, a location of the surrounding object of the vehicle or a moving trajectory of the vehicle, and switches an output screen to the conversion image. Accordingly, it is possible to improve the convenience of a driver by actively switching a camera view to obtain information required for parking and providing it to the driver.

18 Claims, 12 Drawing Sheets

(56) References Cited

U.S. PATENT DOCUMENTS

| | | | | |
|---|---|---|---|---|
| 2005/0083427 A1* | 4/2005 | Imoto | ............... | H04N 23/55 |
| | | | | 348/E7.087 |
| 2008/0143833 A1* | 6/2008 | Yanai | ............... | B60R 1/28 |
| | | | | 348/148 |
| 2009/0102922 A1* | 4/2009 | Ito | ............... | H04N 7/181 |
| | | | | 348/148 |
| 2010/0238051 A1* | 9/2010 | Suzuki | ............... | B62D 15/027 |
| | | | | 340/932.2 |
| 2014/0104422 A1* | 4/2014 | Choi | ............... | G06V 10/507 |
| | | | | 348/148 |
| 2014/0354452 A1* | 12/2014 | Okuyama | ............... | G08G 1/143 |
| | | | | 340/932.2 |
| 2015/0258988 A1* | 9/2015 | Morimoto | ............... | B60K 28/10 |
| | | | | 701/70 |
| 2017/0177956 A1* | 6/2017 | Zhang | ............... | G06V 10/753 |
| 2019/0102634 A1* | 4/2019 | Sagami | ............... | G06V 20/593 |
| 2020/0074192 A1* | 3/2020 | Ogata | ............... | G08G 1/16 |
| 2021/0056848 A1* | 2/2021 | Tsuge | ............... | B62D 15/0285 |
| 2023/0049561 A1* | 2/2023 | Sun | ............... | G06V 10/255 |

* cited by examiner

APPARATUS AND METHOD FOR CONTROLLING VEHICLE

CROSS-REFERENCE TO RELATED APPLICATION

This application is based on and claims under 35 U.S.C. § 119 (a) the benefit of Korean Patent Application No. 10-2022-0016396, filed in the Korean Intellectual Property Office on Feb. 8, 2022, the entire contents of which are incorporated herein by reference.

TECHNICAL FIELD

Embodiments of the present disclosure relate to an apparatus and method for controlling a vehicle.

DESCRIPTION OF RELATED ART

Surround view monitoring technology is a parking assistance technology that synthesizes the front, rear, left and right images obtained by a vehicle and provides it to the driver.

However, such a synthesized image is substantially distorted, so that it is difficult to identify precise information around a vehicle. In addition, because the surrounding situation continues to change as the vehicle moves during parking, it is difficult to precisely grasp the surrounding situation of the vehicle only with the composite image, so that a user must manually change the camera view setting mode to accurately grasp the surrounding situation.

SUMMARY

Embodiments of the present disclosure have been made to solve the above-mentioned problems occurring in the prior art while advantages achieved by the prior art are maintained intact.

An exemplary embodiment of the present disclosure provides an apparatus and method for controlling a vehicle capable of obtaining information required for parking by actively switching a camera view during parking.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, an apparatus for controlling a vehicle includes a camera that obtains a surrounding image of the vehicle, a sensor that detects a surrounding object of the vehicle, and a controller that determines a conversion image from among the surrounding images based on one of a parking area when the vehicle is parked, a location of the surrounding object of the vehicle or a moving trajectory of the vehicle, and switches an output screen to the conversion image.

In some embodiments, the camera may obtain the surrounding image that includes a front image, a left front image, a right front image, a rear image, a left rear image, a right rear image, a left image, and a right image of the vehicle.

In some embodiments, the controller may determine the surrounding image including an area in a direction in which an obstacle is detected as the conversion image when the obstacle is detected in a vicinity of the vehicle.

In some embodiments, the controller may predict the moving trajectory of the vehicle and determine the surrounding image including an area including the moving trajectory of the vehicle as the conversion image.

In some embodiments, the controller may determine an entry rate of the vehicle in the parking area when recognizing the parking area in which the vehicle is to be parked.

In some embodiments, the controller may determine the surrounding image including a parking line located on left and right sides of the vehicle as the conversion image when determining that the entry rate of the vehicle exceeds a first reference value.

In some embodiments, the controller may determine the surrounding image including a rear side area opposite to a rotation direction of a steering wheel of the vehicle as the conversion image when determining that the entry rate of the vehicle is less than a second reference value.

In some embodiments, the controller may determine the conversion image based on an angle between a parking line positioned on left and right sides of the vehicle and the vehicle when one of rear wheels of the vehicle is included in the parking area.

In some embodiments, the controller may determine the surrounding image including the parking line positioned on the left and right sides of the vehicle as the conversion image when determining that the angle between the parking line and the vehicle is less than a first reference angle.

In some embodiments, the controller may determine, as the conversion image, the surrounding image including a rear side area in a direction opposite to a rotation direction of a steering wheel of the vehicle when determining that the angle between the parking line and the vehicle exceeds a second reference angle.

According to another embodiment of the present disclosure, a method of controlling a vehicle includes determining a conversion image from among surrounding images based on one of a parking area when the vehicle is parked, a location of a surrounding object of the vehicle or a moving trajectory of the vehicle, wherein the surrounding images are detected by a camera, and switching an output screen to the conversion image.

In some embodiments, the camera may obtain the surrounding image that includes a front image, a left front image, a right front image, a rear image, a left rear image, a right rear image, a left image, and a right image of the vehicle.

In some embodiments, the method may further include determining the surrounding image including an area in a direction in which an obstacle is detected as the conversion image when the obstacle is detected in a vicinity of the vehicle.

In some embodiments, the method may further include predicting the moving trajectory of the vehicle, and determining the surrounding image including an area including the moving trajectory of the vehicle as the conversion image.

In some embodiments, the method may further include determining an entry rate of the vehicle in the parking area when recognizing the parking area in which the vehicle is to be parked.

In some embodiments, the method may further include determining the surrounding image including a parking line located on left and right sides of the vehicle as the conversion image when it is determined that the entry rate of the vehicle exceeds a first reference value.

In some embodiments, the method may further include determining the surrounding image including a rear side area opposite to a rotation direction of a steering wheel of the vehicle as the conversion image when it is determined that the entry rate of the vehicle is less than a second reference value.

In some embodiments, the method may further include determining the conversion image based on an angle between a parking line positioned on left and right sides of the vehicle and the vehicle when one of rear wheels of the vehicle is included in the parking area.

In some embodiments, the method may further include determining the surrounding image including the parking line positioned on the left and right sides of the vehicle as the conversion image when it is determined that the angle between the parking line and the vehicle is less than a first reference angle.

In some embodiments, the method may further include determining, as the conversion image, the surrounding image including a rear side area in a direction opposite to a rotation direction of a steering wheel of the vehicle when it is determined that the angle between the parking line and the vehicle exceeds a second reference angle.

As discussed, the method and system suitably include use of a controller or processor.

In another embodiment, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
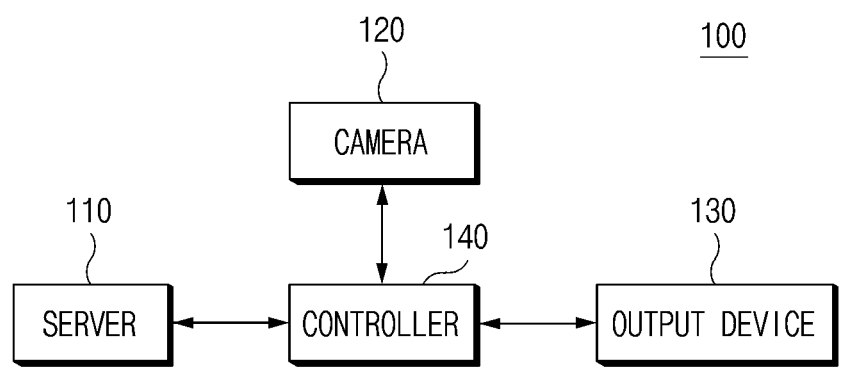
FIG. 1 is a block diagram illustrating the configuration of an apparatus for controlling a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of an apparatus for controlling a vehicle according to an exemplary embodiment of the present disclosure.

As shown in FIG. 1, an apparatus 100 for controlling a vehicle according to the present disclosure may include a sensor 110, a camera 120, an output device 130, and a controller 140.

The sensor 110 may detect an object around the vehicle. According to an exemplary embodiment of the present disclosure, the sensor 110 may include an ultrasonic sensor, a lidar, a radar, and the like, and detect an object around the vehicle. In this case, an object may include other vehicles located around the vehicle, structures on a road, lines (parking lines) of a road, and uneven portions (potholes, bumps) on a road surface, and the like, and may include matters that the driver should consider during parking.

In addition, the sensor 110 may include a shift stage sensor for detecting a position of a shift stage of the vehicle, a vehicle speed sensor for detecting a vehicle speed, and a steering wheel sensor for detecting a rotation direction of a steering wheel.

The camera 120 may include a left camera, a right camera, a rear camera, and a front camera arranged on the left, right, rear, and front of the vehicle in order to obtain a front image of the vehicle obtained by photographing the front area of the vehicle, a left front image obtained by photographing a left front area of the vehicle, a right front image obtained by photographing a right front area of the vehicle, a rear image obtained by photographing a rear area of the vehicle, a left rear image obtained by photographing a left rear area of the vehicle, a right rear image obtained by photographing a right rear area of the vehicle, a left image obtained by photographing a left side area of the vehicle, a right image obtained by photographing a right side area of the vehicle, and a surrounding image including a top view image obtained by synthesizing the front image, the rear image, the left image, and the right image of the vehicle.

The left camera may be arranged inside a case surrounding a left side mirror. Alternatively, the left camera may be arranged outside the case surrounding the left side mirror. Alternatively, the left camera may be arranged in an area outside a left front door, left rear door or left fender.

The right camera may be arranged inside a case surrounding a right side mirror. Alternatively, the right camera may be arranged outside the case surrounding the right side mirror. Alternatively, the right camera may be arranged in an area outside a right front door, right rear door or right fender.

The rear camera may be arranged near a rear license plate, trunk or tailgate switch.

The front camera may be arranged near an emblem or a radiator grill.

In addition, the camera 120 may be mounted in the vehicle to obtain a driver image.

The output device 130 may output the surrounding image obtained by the camera 120, and may output an obstacle detection warning sound when a surrounding obstacle is detected. To this end, the output device 130 may be implemented as a display device or a sound output device. In this case, the display device may include a navigation display device, a HUD, a cluster, and the like.

The controller 140 may be implemented with various processing devices such as a microprocessor and the like in which a semiconductor chip capable of performing operations or executions of various commands is built-in, and may control operations of a vehicle according to an exemplary embodiment of the present disclosure.

The controller 140 may determine whether the vehicle speed is less than a reference speed. When it is determined that the vehicle speed is less than the reference speed, the controller 140 may determine that the vehicle is in a low-speed driving state in which the vehicle moves for parking.

The controller 140 may determine the position of the shift stage in the low-speed driving state, and output an image set corresponding to the position of the shift stage. The details will be described with reference to FIGS. 2 and 3.

Figure 2:
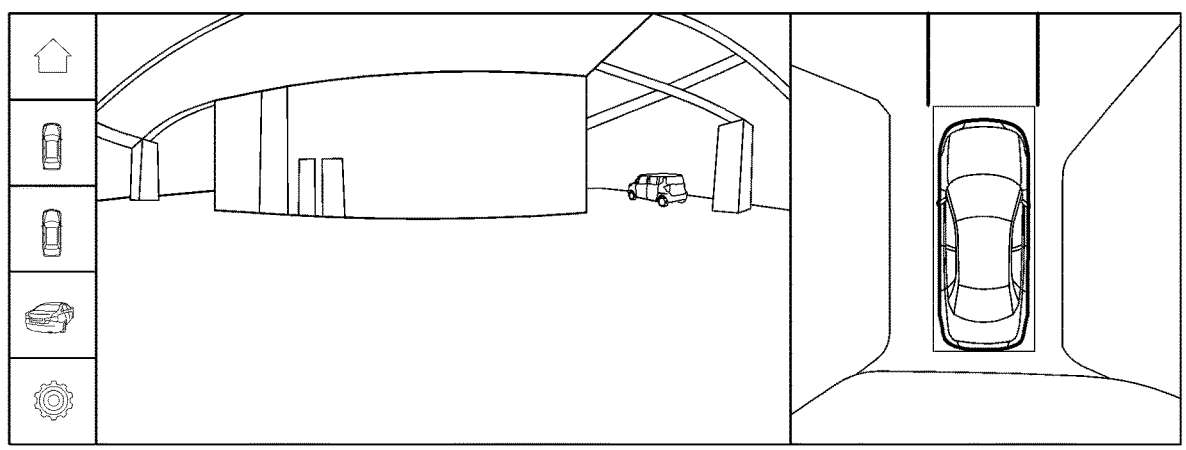
FIGS. 2 and 3 are views illustrating surrounding images output corresponding to the position of the shift stage according to an exemplary embodiment of the present disclosure.
Figure 3:
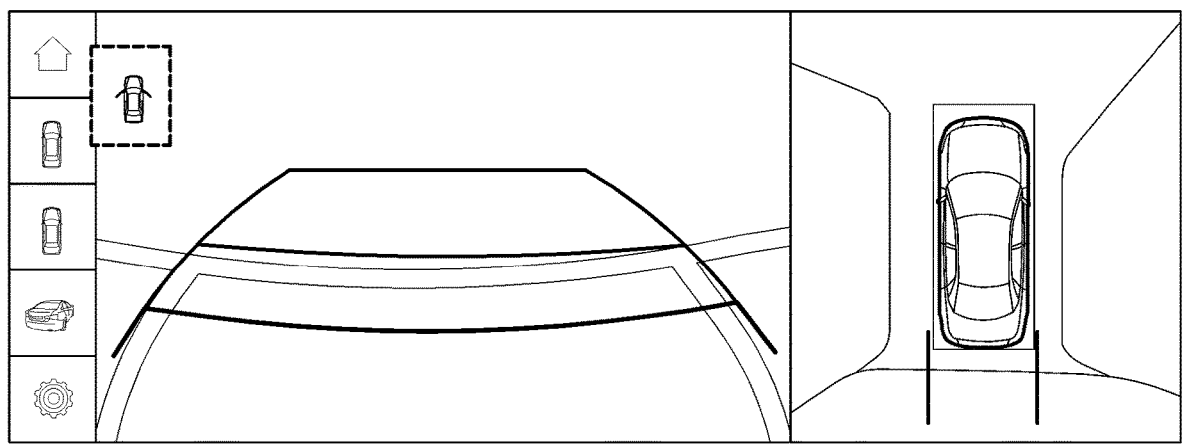

FIGS. 2 and 3 are views illustrating surrounding images output corresponding to the position of the shift stage according to an exemplary embodiment of the present disclosure.

When it is determined that the shift stage is located in stage 'D', as shown in FIG. 2, the controller 140 may be set to output the front image and the top view image (synthetic image) through the output device 130. In addition, when it is determined that the shift stage is located at stage 'R', as shown in FIG. 3, the controller 140 may be set to output the rear image and the top view image (synthetic image) through the output device 130. Hereinafter, for convenience, the surrounding image output corresponding to the position of the shift stage is referred to as a basic image.

The controller 140 may determine whether an obstacle detection notification is output in the vicinity of the vehicle while the basic image is output to the output device 130. In this case, the obstacle may include other vehicles, uneven portions of a road surface, curbs of a road, and the like. When it is determined that an obstacle detection notification is output in the vicinity of the vehicle, the controller 140 may determine the surrounding image including an area in a direction in which the obstacle is detected as a conversion image, and switch an output screen output to the output device 130 to the conversion image. For a more detailed description, refer to FIG. 6.

Figure 6:
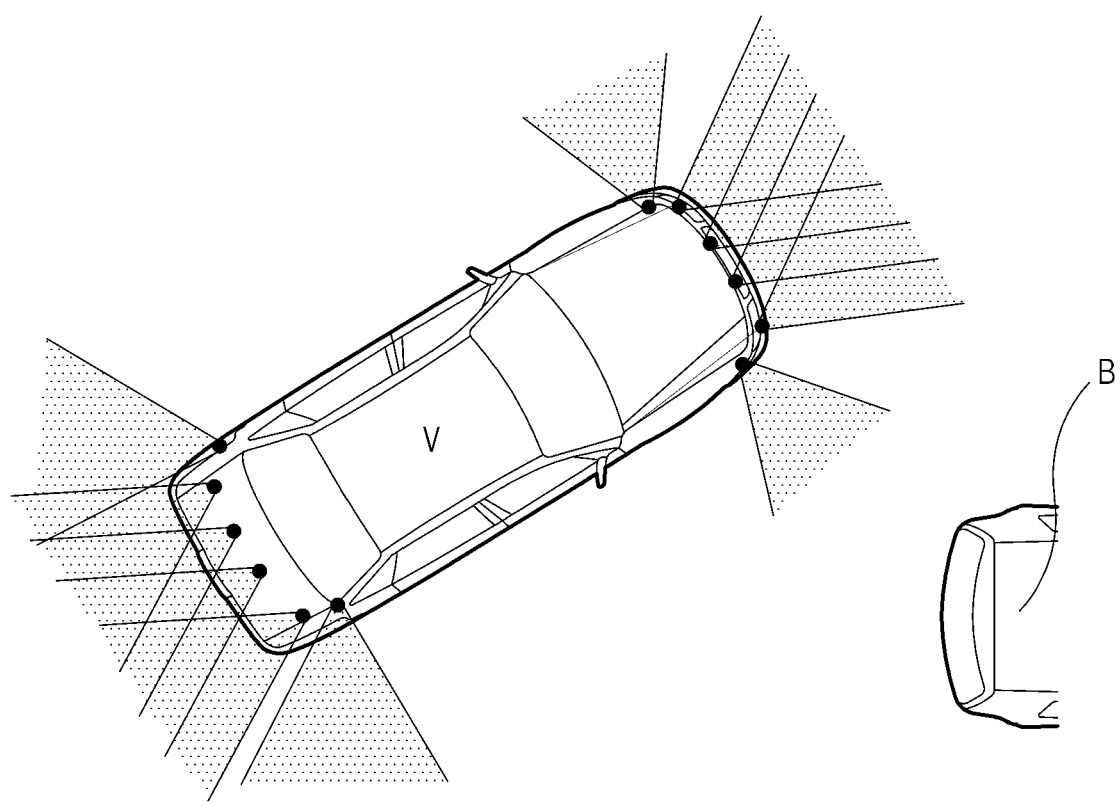
FIG. 6 is a diagram illustrating a case in which an obstacle is detected in the vicinity of a vehicle according to an exemplary embodiment of the present disclosure.

FIG. 6 is a diagram illustrating a case in which an obstacle is detected in the vicinity of a vehicle according to an exemplary embodiment of the present disclosure.

As shown in FIG. 6, when an obstacle (another vehicle "B") is detected in the right front of a vehicle "V" and a detection notification is output, the controller 140 may determine the surrounding image including a right front side as the conversion image and control to switch the output screen to the conversion image.

In addition, when an uneven portion (pothole or speed bump) of a road surface or a curb of a road is detected around the vehicle, the controller 140 may determine the surrounding image including the uneven portion of the road surface or the curb of the road as the conversion image and control to switch the output screen to the conversion image. According to an exemplary embodiment of the present disclosure, the controller 140 may enlarge the conversion image to output the conversion image such that the driver may intuitively identify the obstacle or identify a curvature of the road surface or the curb of the road.

Meanwhile, the controller 140 may output a basic image when an obstacle detection notification is not output in the vicinity of the vehicle, or when an uneven portion of a road surface or a curb of a road is not detected. In addition, when an obstacle is detected and then not detected, the controller 140 may restore the basic image from the conversion image.

The controller 140 may determine whether the moving trajectory of a vehicle is predicted. According to an exemplary embodiment of the present disclosure, the controller 140 may predict the moving trajectory of the vehicle when information on the position of the shift stage and the steering angle of the vehicle are obtained.

When it is determined that the moving trajectory of the vehicle is predicted, the controller 140 may determine the surrounding image including the moving trajectory as the conversion image, and control to switch the output screen to the conversion image. For a more detailed description, refer to FIG. 7.

Figure 7:
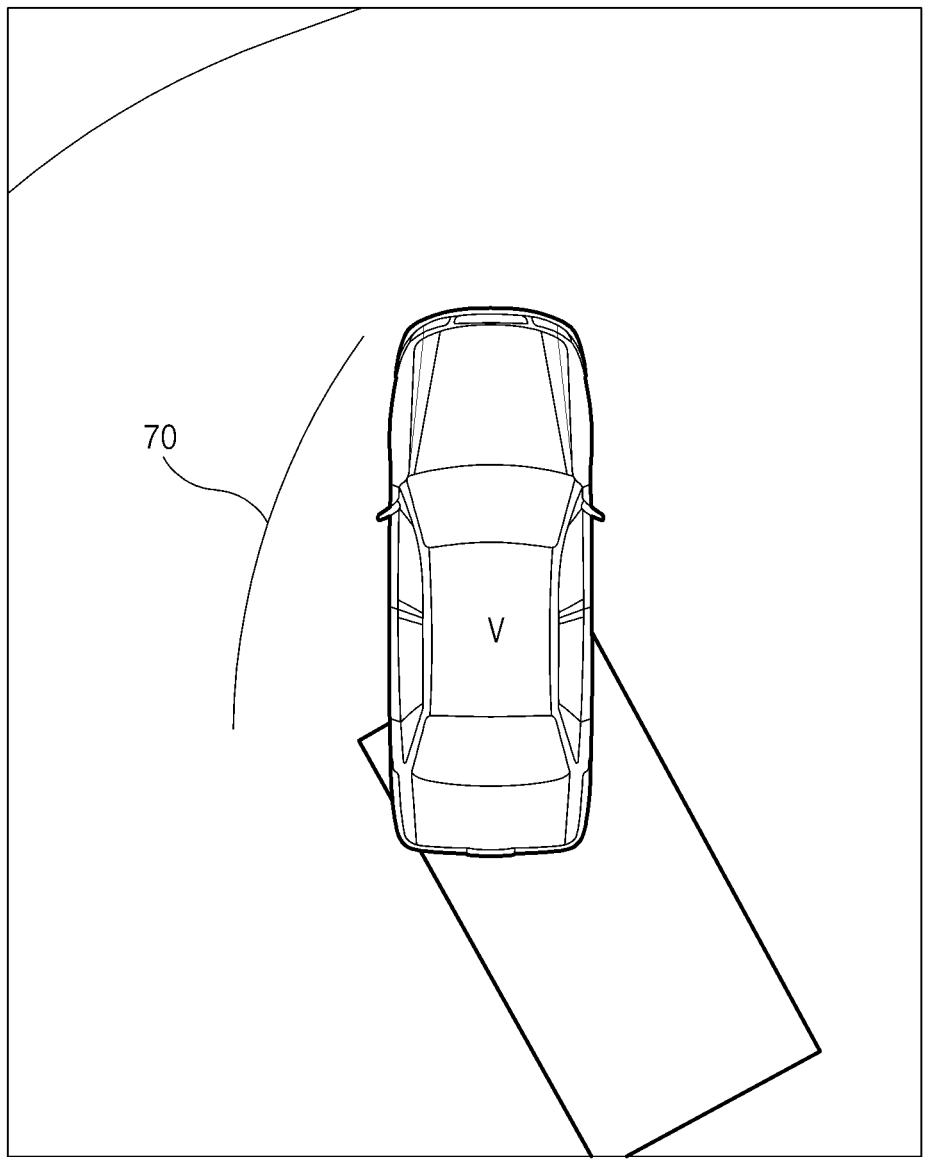
FIG. 7 is a diagram illustrating a moving trajectory predicted according to an exemplary embodiment of the present disclosure.

FIG. 7 is a diagram illustrating a moving trajectory predicted according to an exemplary embodiment of the present disclosure.

As shown in FIG. 7, when a moving trajectory 70 of the vehicle "V" is predicted, the controller 140 may determine, as the conversion image, an area including the moving trajectory of the vehicle, that is, the surrounding area including the left area of the vehicle, and control to switch the output screen to the conversion image.

Meanwhile, when the moving trajectory of the vehicle is not predicted, the controller 140 may output the basic image. In addition, when the moving trajectory of the vehicle is predicted and then not predicted, the controller 140 may restore the conversion image to the basic image.

The controller 140 may determine whether a parking area (parking line) is recognized. When recognizing the parking area, the controller 140 may determine the entry rate of the vehicle in the parking area.

When the shift stage of the vehicle is located in the stage "R" and the parking area is recognized, the controller 140 may determine the rate of entry of the vehicle into the parking area based on the top view image (how much the vehicles have entered the parking area). According to an exemplary embodiment, the controller 140 may determine the entry rate of the vehicle based on a degree of overlap between the vehicle and the parking area.

For a more detailed description, refer to FIGS. 4, 5, 8 and 9.

Figure 4:
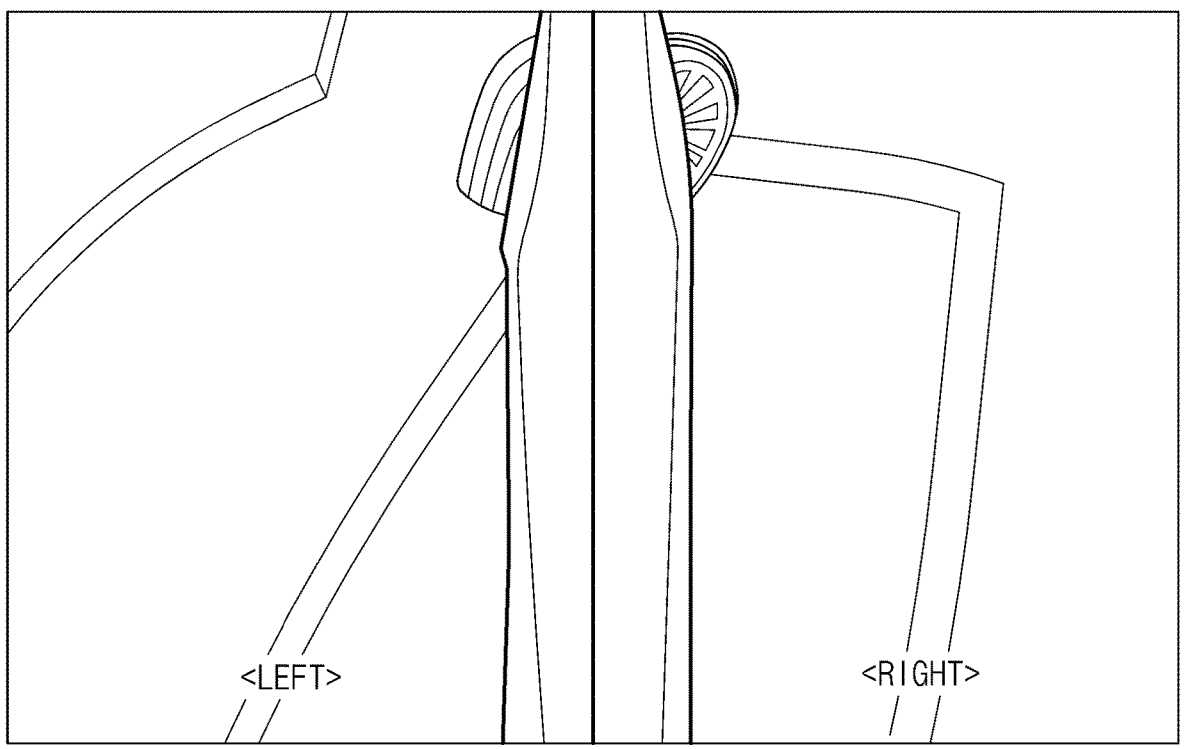
FIGS. 4 and 5 are diagrams illustrating a conversion image according to an exemplary embodiment of the present disclosure.
Figure 5:
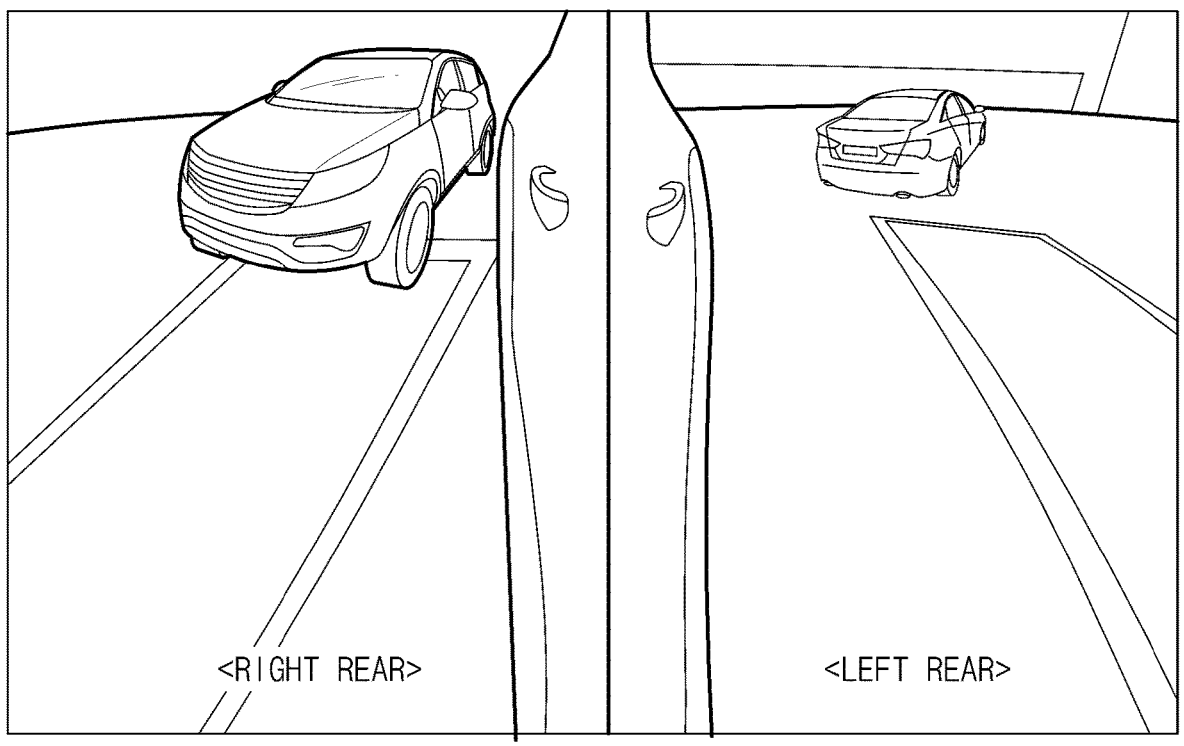
Figure 8:
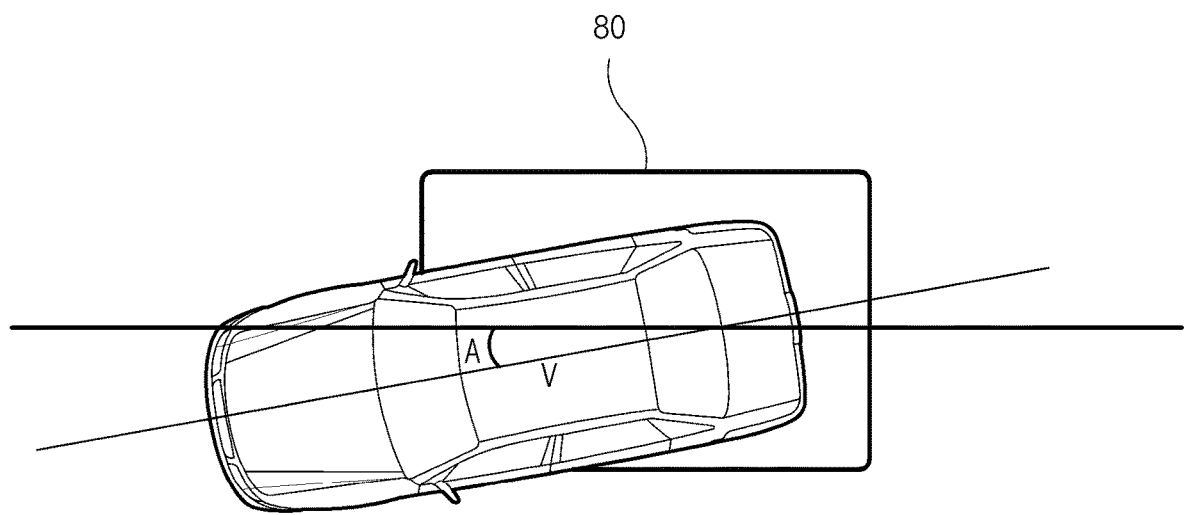
FIGS. 8 and 9 are diagrams illustrating a situation of entering a parking area according to an exemplary embodiment of the present disclosure.
Figure 9:
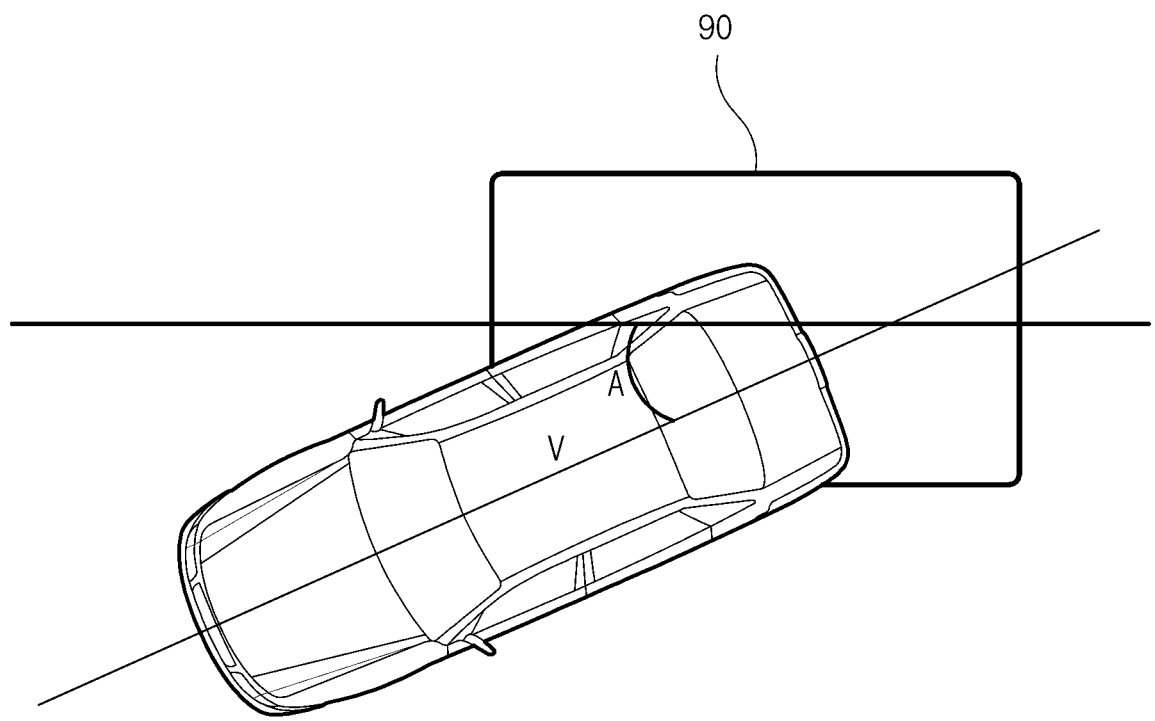

FIGS. 4 and 5 are diagrams illustrating a conversion image according to an exemplary embodiment of the present disclosure. FIGS. 8 and 9 are diagrams illustrating a situation of entering a parking area according to an exemplary embodiment of the present disclosure.

As shown in FIG. 8, when the entry rate of the vehicle "V" into a parking area 80 exceeds a first reference value (e.g., 70%), the controller 140 may determine the conversion image and switch the output screen to the conversion image. The controller 140 may determine that most of the vehicle has entered the parking area when the entry rate of the vehicle exceeds the first reference value. The controller 140 may determine a situation in which the left and right sides of the vehicle must be aligned with the parking line, and determine the surrounding image including the left and right areas as the conversion image. According to an exemplary embodiment, as shown in FIG. 4, the surrounding image including the left and right areas (the area including parking lines located on the left and right sides of the vehicle) of the vehicle may be determined as the conversion image, and the output screen may be switched to the conversion image.

When it is determined that the entry rate of the vehicle does not exceed the first reference value, the controller 140 may determine whether the entry rate of the vehicle is less than a second reference value.

As shown in FIG. 9, when the entry rate of the vehicle "V" into a parking area 90 is less than the second reference value (e.g., 50%), and the steering wheel of the vehicle is rotated, the controller 140 may determine the surrounding image including a rear side area in a direction opposite to a rotation direction of the steering wheel of the vehicle as the conversion image, and switch the output screen to the conversion image.

The controller 140 may determine that the entry rate of the vehicle is less than the second reference value as that the vehicle needs to further enter the parking area. Then, the controller 140 may determine, as the conversion image, the surrounding image including the rear area in the direction opposite to the rotation direction of the steering wheel such that the vehicle may further enter the parking area. According to an exemplary embodiment, as shown in FIG. 5, the controller 140 may determine, as the conversion image, the surrounding image including the left or right rear area in the rotation direction of the steering wheel of the vehicle, and switch the output screen to the conversion image.

When the entry rate of the vehicle "V" into the parking area 90 is not less than the second reference value (e.g., 50%), the controller 140 may determine, as the conversion image, the surrounding image including the left and right areas (including the parking lines located at the left and right sides of the vehicle) of the vehicle and switch the output screen to the conversion image.

When the entry rate of the vehicle "V" into the parking area 90 is less than the second reference value (e.g., 50%), and the steering wheel of the vehicle is not rotated, the controller 140 may allow the output screen to be output as a basic image (the rear and top view images).

According to an exemplary embodiment, the controller 140 may determine the conversion image based on the angle between the vehicle and the parking line in addition to determining the conversion area using the entry rate.

When the shift stage of the vehicle is positioned at stage "R", and one of both rear wheels of the vehicle is included in the parking area based on the top view image, the controller 140 may determine an angle "A" between the parking line located on the left and right sides of the vehicle "V" and the vehicle "V".

As shown in FIG. 8, when it is determined that the angle "A" is less than the first reference angle (e.g., 20 degrees), the controller 140 may determine that most of the vehicle have entered the parking area. In addition, the controller 140 may determine that the left and right sides of the vehicle need to be aligned with the parking line, and determine the surrounding image including the left and right areas of the vehicle as the conversion image. When it is determined that the angle "A" is not less than the first reference angle, the controller 140 may determine whether the angle exceeds the second reference angle.

As shown in FIG. 9, when it is determined that the angle "A" exceeds the second reference angle (e.g., 30 degrees) and the steering wheel is in a rotated state, the controller 140 may determine the surrounding image including the rear side area in the direction opposite to the rotation direction of the steering wheel as the conversion image.

Meanwhile, when the angle "A" does not exceed the second reference angle (e.g., 30 degrees), the controller 140 may determine the surrounding image including the left and right areas of the vehicle as the conversion image. In addition, when the steering wheel of the vehicle is not rotated, the controller 140 may output the output screen as the basic image (rear and top view images).

The controller 140 may determine a direction in which the field of view of a driver is directed based on a driver image. When the field of view of a driver is directed forward, the controller 140 may output an image set corresponding to the position of the shift stage. Meanwhile, when the direction of the field of view of a driver is not forward, the controller 140 may determine the surrounding image including the area to which the field of view of the driver is directed as the conversion image and switch the output screen to the conversion image.

Figure 10:
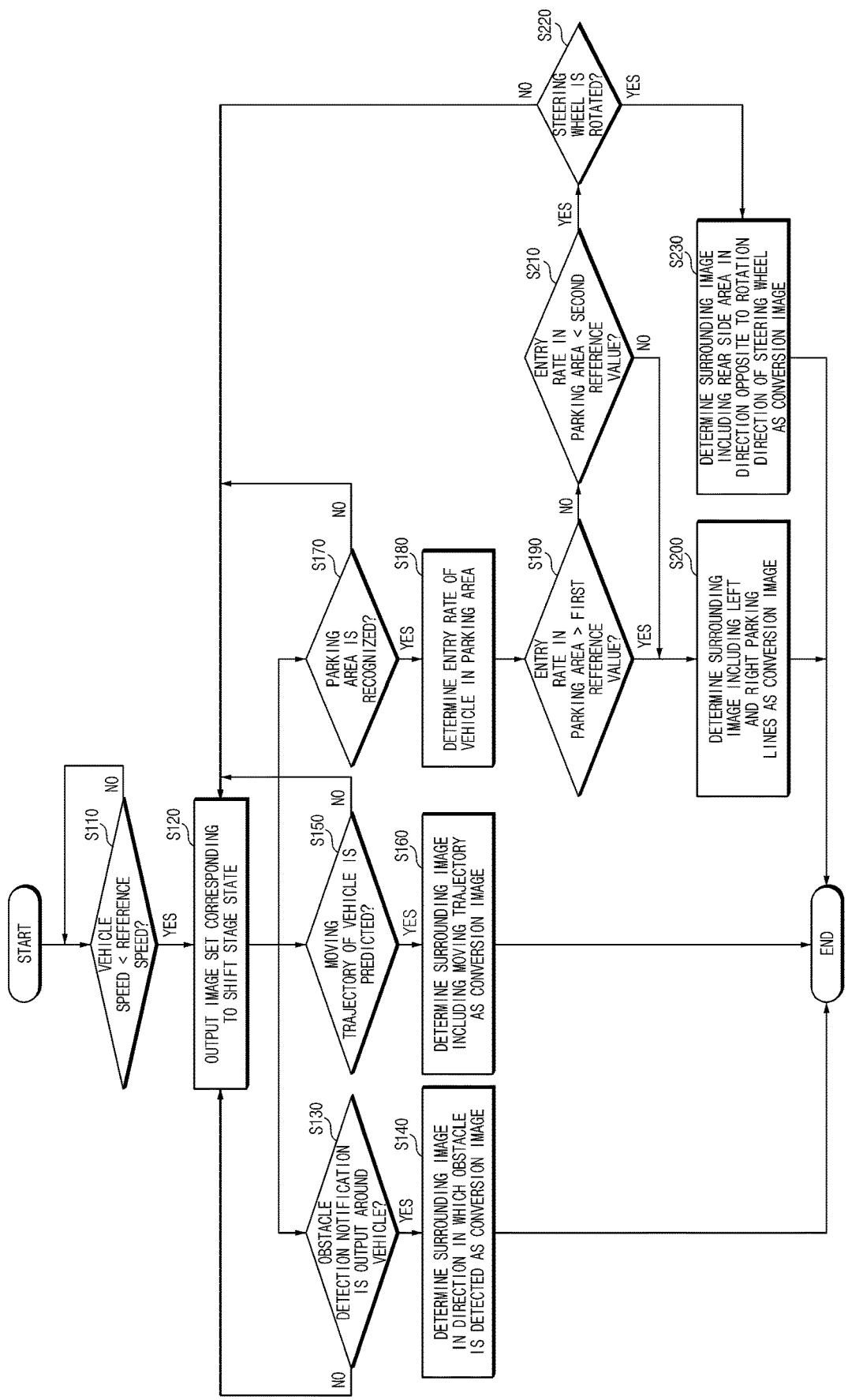
FIGS. 10 and 11 are flowcharts illustrating a method of controlling a vehicle according to an exemplary embodiment of the present disclosure.
Figure 11:
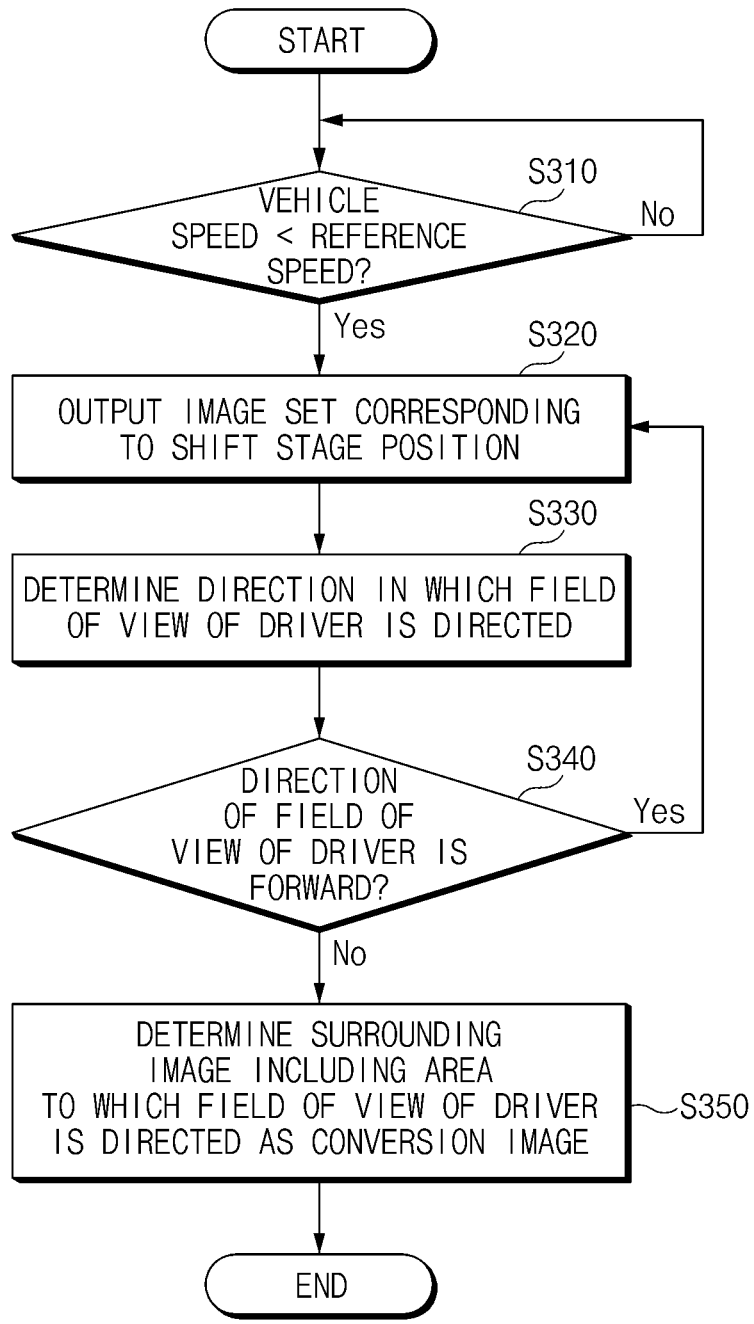

FIGS. 10 and 11 are flowcharts illustrating a method of controlling a vehicle according to an exemplary embodiment of the present disclosure.

As shown in FIG. 10, in S110, the controller 140 may determine whether the vehicle speed is less than the reference speed. When it is determined in S110 that the vehicle speed is less than the reference speed (Yes), the controller 140 may determine that the vehicle is in a low-speed driving state such as moving for parking.

In S120, the controller 140 may determine the position of the shift stage in the low-speed driving state, and output the basic image set corresponding to the position of the shift stage.

When it is determined in S120 that the shift stage is located in stage "D", as shown in FIG. 2, the controller 140 may be set to output the basic image including the front and top view images (synthetic image) through the output device 130. In addition, when it is determined that the shift stage is located at stage "R", as shown in FIG. 3, the controller 140 may be set to output the basic image including the rear and top view images (synthetic image) through the output device 130.

In S130, the controller 140 may determine whether the obstacle detection notification is output in the vicinity of the vehicle in a state in which the basic image is output. In this case, the obstacle may include other vehicles, uneven portions of a road surface, curbs of a road, and the like. When it is determined in S130 that the obstacle detection notification is output in the vicinity of the vehicle (Yes), in S140, the controller 140 may determine the surrounding image including the area in the direction in which the obstacle is detected as the conversion image. In addition, in S140, the controller 140 may switch the output screen output through the output device 130 into the conversion image.

According to an exemplary embodiment, as shown in FIG. 6, when the obstacle (another vehicle "B") is detected at the right front of the vehicle "V" and the detection notification is output in S130, the controller 140 may determine the surrounding image including the right front as the conversion image, and control to switch the output screen to the conversion image in S140.

In addition, according to an exemplary embodiment, when an uneven portion (pothole or speed bump) of a road surface or a curb of a road is detected around the vehicle in S130, the controller 140 may determine the surrounding image including the uneven portion of the road surface or the curb of the road as the conversion image and control to switch the output screen to the conversion image in S140.

According to an exemplary embodiment of the present disclosure, the controller 140 may enlarge the conversion image to output the conversion image such that the driver may intuitively identify the obstacle or identify a curvature of the road surface or the curb of the road.

Meanwhile, when an obstacle is not detected in S130 (No), the controller 140 may output the basic image in S120.

In addition, when an obstacle is detected and not detected, the controller 140 may restore the basic image from the conversion image.

In S150, the controller 140 may determine whether the moving trajectory of the vehicle is predicted. According to an exemplary embodiment of the present disclosure, in S150, the controller 140 may predict the moving trajectory of the vehicle when information on the position of the shift stage and the steering angle of the vehicle are obtained.

When it is determined in S150 that the moving trajectory of the vehicle is predicted (Yes), in S160, the controller 140 may determine the surrounding image including the moving trajectory as the conversion image. In addition, in S160, the controller 140 may control to switch the output screen to the conversion image.

According to an exemplary embodiment, as shown in FIG. 7, when the moving trajectory 70 of the vehicle V is predicted in S150, in S160, the controller 140 may determine, as the conversion image, the surrounding image including an area including the moving trajectory of the vehicle, that is, the left area, the left rear area and the right rear area, and control to switch the output screen to the conversion image.

Meanwhile, when the moving trajectory of the vehicle is not predicted in S150 (No), the controller 140 may output the basic image in S120. In addition, when the moving trajectory of the vehicle is predicted and not predicted, the controller 140 may restore the basic image to the conversion image.

In S170, the controller 140 may determine whether the parking area (parking line) is recognized. In S170, the controller 140 may determine whether the parking area is recognized in a state where the shift stage of the vehicle is located at state "R".

When the parking area is recognized in S170 (Yes), in S180, the controller 140 may determine the entry rate of the vehicle in the parking area. When the parking area is not recognized in S170 (No), the controller 140 may output the basic image in S120.

In S180, the controller 140 may determine the rate of entry of the vehicle into the parking area (how much the vehicle has entered the parking area) based on the top view image. According to an exemplary embodiment, the controller 140 may determine the entry rate of the vehicle based on the overlap between the vehicle and the parking area.

In S190, the controller 140 may determine whether the entry rate of the vehicle exceeds the first reference value.

As shown in FIG. 8, when the entry rate of the vehicle "V" into the parking area 80 exceeds the first reference value (e.g., 70%) in S190 (Yes), the controller 140 may determine that most of the vehicle has entered the parking area, and determine a situation in which the left and right sides of the vehicle must be aligned with the parking line.

Then, when the entry rate of the vehicle "V" into the parking area 80 exceeds the first reference value (e.g., 70%) in S190, in S200, the controller 140 may determine, as the conversion image, the surrounding image including the left and right areas of the vehicle. As shown in FIG. 4, in S200, the controller 140 may determine the surrounding image including the left and right areas (the area including parking lines located on the left and right sides of the vehicle) of the vehicle as the conversion image, and switch the output screen to the conversion image.

In S210, the controller 140 may determine whether the entry rate of the vehicle is less than the second reference value, when the entry rate of the vehicle does not exceed the first reference value in S190 (No).

As shown in FIG. 9, when it is determined in S210 that the entry rate of the vehicle "V" into the parking area 90 is less than the second reference value (e.g., 50%), in S220, the controller 140 may determine whether the steering wheel of the vehicle is in a rotation state. Meanwhile, when it is determined in S210 that the entry rate of the vehicle "V" into the parking area 90 is not less than the second reference value (e.g., 50%) (No), the controller 140 may perform S200.

When it is determined in S220 that the steering wheel of the vehicle is in a rotated state (Yes), in S230, the controller 140 may determine, as the conversion image, the surrounding image including the rear side area in the direction opposite to the rotating direction of the steering wheel of the vehicle. In addition, in S230, the controller 140 may switch the output screen to the conversion image.

The controller 140 may determine that the vehicle needs to further enter the parking area when the entry rate of the vehicle is less than the second reference value in S210. Then, in S230, the controller 140 may determine, as the conversion image, the surrounding image including the rear side area in the direction opposite to the rotation direction of the steering wheel such that the vehicle may further enter the parking area. According to an exemplary embodiment, as shown in FIG. 5, in S230, the controller 140 may determine, as the conversion image, the surrounding image including the left or right rear area in the rotation direction of the steering wheel of the vehicle, and switch the output screen to the conversion image.

Meanwhile, when the steering wheel of the vehicle is not rotated (No), in S220, the controller 140 may output the output screen as the basic image.

When the parking area is recognized, the controller 140 may determine the conversion image based on the angle between the vehicle and the parking line in addition to the scheme of determining the conversion image according to the entry rate of the vehicle.

According to an exemplary embodiment, in S180, when one of the rear wheels of the vehicle is included in the parking area based on the top view image, the controller 140 may determine the angle "A" between the parking line located on the left and right sides of the vehicle "V" and the vehicle "V".

According to an exemplary embodiment, in S190, the controller 140 may determine whether the angle "A" is less than the first reference angle (e.g., 20 degrees).

When it is determined in S190 that the angle "A" is less than the first reference angle (Yes), in S200, the controller 140 may determine that most of the vehicle has entered the parking area, and determine a situation in which the left and right sides of the vehicle are to be aligned with the parking line, and determine the surrounding image including the left and right areas of the vehicle as the transition image.

When it is determined in S190 that the angle "A" is not less than the first reference angle (No), in S210, the controller 140 may determine whether the angle "A" exceeds the second reference angle (e.g., 30 degrees).

When it is determined in S210 that the angle "A" exceeds the second reference angle (e.g., 30 degrees) (Yes), in S220, the controller 140 may determine whether the steering wheel of the vehicle is in a rotated state.

When it is determined in S210 that the angle "A" does not exceed the second reference angle (e.g., 30 degrees) (No), the controller 140 may perform S200.

When it is determined in S220 that the steering wheel of the vehicle is in a rotated state (Yes), in S230, the controller 140 may determine the surrounding image including the rear side area in the direction opposite to the rotation direction of the steering wheel of the vehicle as the conversion image. In addition, in S230, the controller 140 may switch the output screen to the conversion image.

When it is determined in S220 that the steering wheel of the vehicle is not rotated (No), the controller 140 may output the basic image as the output image in S120.

As shown in FIG. 11, in S310, the controller 140 may determine whether the vehicle speed is less than the reference speed. When it is determined in S310 that the vehicle speed is less than the reference speed (Yes), the controller 140 may determine that the vehicle is in a low-speed driving state such as moving for parking.

In S320, the controller 140 may determine the position of the shift stage in the low-speed driving state, and output the basic image set corresponding to the position of the shift stage.

In S330, the controller 140 may determine the direction in which the field of view of the driver is directed based on the driver image.

In S340, the controller 140 may determine whether the direction in which the field of view of the driver is directed is forward.

When it is determined in S340 that the direction in which the field of view of the driver is directed is forward (Yes), the controller 140 may output the basic image in S320.

Meanwhile, when it is determined in S340 that the direction to which the field of view of the driver is directed is not forward (No), in S350, the controller 140 may determine the surrounding image including the area to which the field of view of the driver is directed as the conversion image, and switch the output screen to the conversion image.

Figure 12:
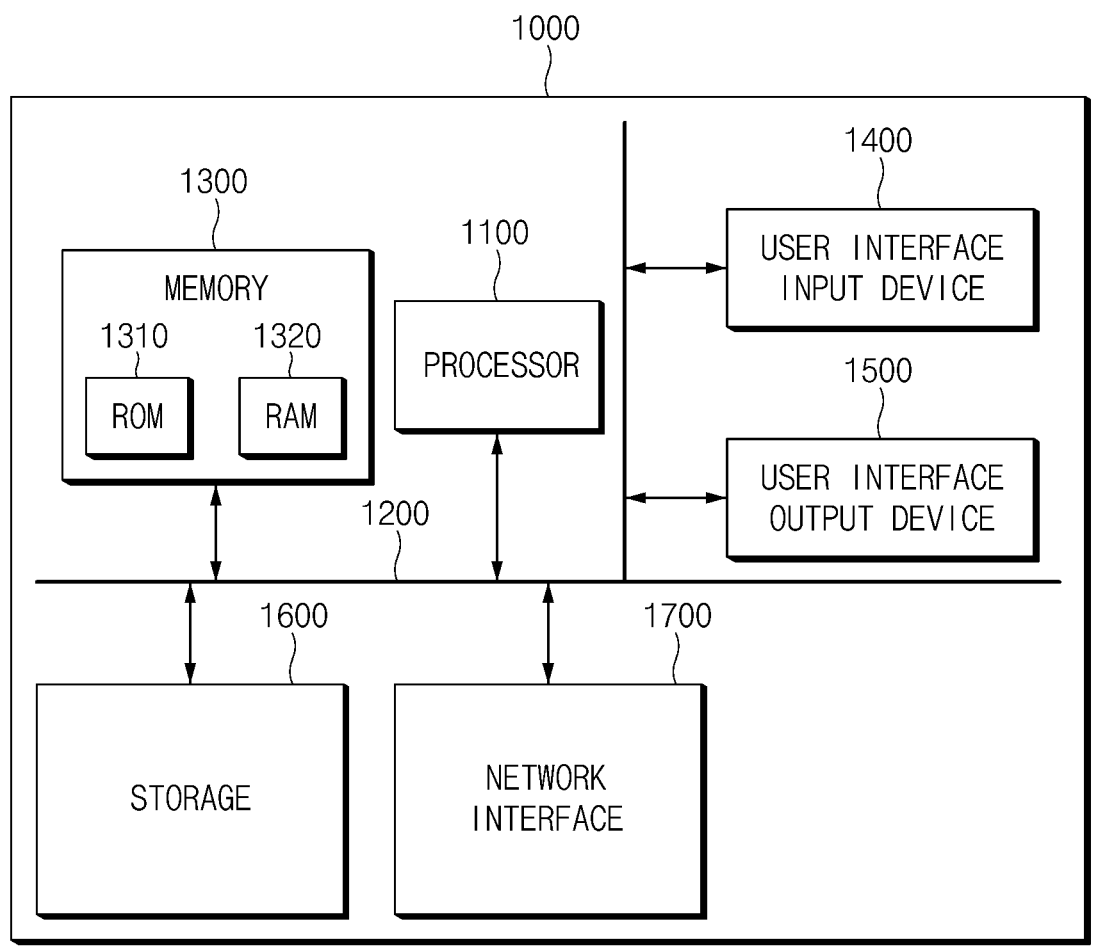
FIG. 12 is a block diagram illustrating a computing system for executing a method according to an exemplary embodiment of the present disclosure.

FIG. 12 is a block diagram illustrating a computing system for executing a method according to an exemplary embodiment of the present disclosure.

Referring to FIG. 12, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method for controlling a vehicle according to an exemplary embodiment of the present disclosure may improve the convenience of a driver by actively switching a camera view to obtain information required for parking and providing it to the driver.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a vehicle, the apparatus comprising:
    a camera configured to obtain a surrounding image of the vehicle;
    a sensor configured to detect a surrounding object of the vehicle; and
    a controller configured to determine a conversion image from among the surrounding images based on one of a parking area when the vehicle is parked, a location of the surrounding object of the vehicle or a moving trajectory of the vehicle, and switch an output screen to the conversion image,
    wherein the controller is further configured to determine the surrounding image including a parking line located on left and right sides of the vehicle as the conversion image when determining that an entry rate of the vehicle in the parking area exceeds a first reference value.

2. The apparatus of claim 1, wherein the camera is further configured to obtain the surrounding image that includes a front image, a left front image, a right front image, a rear image, a left rear image, a right rear image, a left image, and a right image of the vehicle.

3. The apparatus of claim 1, wherein the controller is further configured to determine the surrounding image including an area in a direction in which an obstacle is detected as the conversion image when the obstacle is detected in a vicinity of the vehicle.

4. The apparatus of claim 1, wherein the controller is further configured to predict the moving trajectory of the vehicle and determine the surrounding image including an area including the moving trajectory of the vehicle as the conversion image.

5. The apparatus of claim 1, wherein the controller is further configured to determine the entry rate of the vehicle in the parking area when recognizing the parking area in which the vehicle is to be parked.

6. The apparatus of claim 5, wherein the controller is further configured to determine the surrounding image including a rear side area opposite to a rotation direction of a steering wheel of the vehicle as the conversion image when determining that the entry rate of the vehicle is less than a second reference value.

7. The apparatus of claim 1, wherein the controller is further configured to determine the conversion image based on an angle between the parking line positioned on left and right sides of the vehicle and the vehicle when one of rear wheels of the vehicle is included in the parking area.

8. The apparatus of claim 7, wherein the controller is further configured to determine the surrounding image including the parking line positioned on the left and right sides of the vehicle as the conversion image when determining that the angle between the parking line and the vehicle is less than a first reference angle.

9. The apparatus of claim 7, wherein the controller is further configured to determine, as the conversion image, the surrounding image including a rear side area in a direction opposite to a rotation direction of a steering wheel of the vehicle when determining that the angle between the parking line and the vehicle exceeds a second reference angle.

10. A method of controlling a vehicle, the method comprising:
    determining a conversion image from among surrounding images based on one of a parking area when the vehicle is parked, a location of a surrounding object of the vehicle or a moving trajectory of the vehicle, wherein the surrounding images are detected by a camera;
    switching an output screen to the conversion image; and
    determining the surrounding image including a parking line located on left and right sides of the vehicle as the conversion image when it is determined that an entry rate of the vehicle in the parking area exceeds a first reference value.

11. The method of claim 10, wherein the camera obtains the surrounding image that includes a front image, a left front image, a right front image, a rear image, a left rear image, a right rear image, a left image, and a right image of the vehicle.

12. The method of claim 10, further comprising:
    determining the surrounding image including an area in a direction in which an obstacle is detected as the conversion image when the obstacle is detected in a vicinity of the vehicle.

13. The method of claim 10, further comprising:
    predicting the moving trajectory of the vehicle; and
    determining the surrounding image including an area including the moving trajectory of the vehicle as the conversion image.

14. The method of claim 10, further comprising:
    determining the entry rate of the vehicle in the parking area when recognizing the parking area in which the vehicle is to be parked.

15. The method of claim 14, further comprising:
    determining the surrounding image including a rear side area opposite to a rotation direction of a steering wheel of the vehicle as the conversion image when it is determined that the entry rate of the vehicle is less than a second reference value.

16. The method of claim 10, further comprising:
    determining the conversion image based on an angle between the parking line positioned on left and right sides of the vehicle and the vehicle when one of rear wheels of the vehicle is included in the parking area.

17. The method of claim 16, further comprising:
    determining the surrounding image including the parking line positioned on the left and right sides of the vehicle as the conversion image when it is determined that the angle between the parking line and the vehicle is less than a first reference angle.

18. The method of claim 16, further comprising:
    determining, as the conversion image, the surrounding image including a rear side area in a direction opposite to a rotation direction of a steering wheel of the vehicle when it is determined that the angle between the parking line and the vehicle exceeds a second reference angle.

\* \* \* \* \*